United States Patent [19]

Fournier

[11] Patent Number: 5,425,266
[45] Date of Patent: Jun. 20, 1995

[54] APPARATUS AND METHOD FOR NON-INTRUSIVE TESTING OF MOTOR VEHICLE EVAPORATIVE FUEL SYSTEMS

[75] Inventor: Thomas J. Fournier, Tucson, Ariz.

[73] Assignee: Envirotest Systems Corp., Tucson, Ariz.

[21] Appl. No.: 186,072

[22] Filed: Jan. 25, 1994

[51] Int. Cl.6 .............................................. G01M 3/26
[52] U.S. Cl. ..................................................... 73/49.7
[58] Field of Search ..................... 73/37, 40.5 R, 40.7, 73/46, 49.1, 49.2, 49.3, 49.7, 49.8

[56] References Cited

U.S. PATENT DOCUMENTS

| | | | |
|---|---|---|---|
| 1,221,733 | 4/1917 | Henderson | 73/49.8 |
| 4,962,744 | 10/1990 | Uranishi et al. | |
| 5,066,208 | 11/1991 | Warmerdam | 73/46 |
| 5,143,035 | 9/1992 | Kayanuma | |
| 5,146,902 | 9/1992 | Cook et al. | |
| 5,239,858 | 8/1993 | Rogers et al. | |
| 5,267,470 | 12/1993 | Cook | 73/49.7 |
| 5,327,776 | 7/1994 | Yasui et al. | 73/118.1 |

Primary Examiner—Robert Raevis
Attorney, Agent, or Firm—Lothrop & West

[57] ABSTRACT

An apparatus and method for the non-intrusive testing of evaporative fuel vapor systems of motor vehicles. A portable pressure control and monitoring unit is inserted into the fuel filler neck of a vehicle. The vapor vent line, leading from the fuel tank to the charcoal canister of the evaporative system, is temporarily clamped off. Pressurized gas is introduced into the unit from an operator's console, expanding a ring bladder and sealing an annular volume between the unit and the filler neck. Gas is then passed through the unit into the contained volume of the evaporative system. After the neck cap is replaced, an automatic timer deflates the ring bladder, charging the remaining volume of the evaporative system. Pressure decay data is collected and stored in the unit's digital storage device. Initially, this data is used in a pass/fail determination made by a microprocessor in the unit. Later, the data is downloaded into a separate computer for archival purposes.

20 Claims, 3 Drawing Sheets

APPARATUS AND METHOD FOR NON-INTRUSIVE TESTING OF MOTOR VEHICLE EVAPORATIVE FUEL SYSTEMS

FIELD OF THE INVENTION

The invention relates generally to the field of apparatus for testing the seal integrity of motor vehicle evaporative fuel systems. More specifically, the invention pertains to a non-intrusive pressure control and monitoring instrument, including a cylindrically-shaped housing adapted for temporary insertion into the fuel filler neck of a motor vehicle. Without disconnecting any fuel vapor lines or other hardware, the apparatus and method disclosed herein test the seal integrity of all evaporative system components, between the fuel cap and the evaporative canister.

BACKGROUND OF THE INVENTION

New federal regulations have established standards for the integrity, or worthiness of the airtight seals included in the evaporative fuel systems of motor vehicles. In response, many state regulatory agencies are requiring periodic testing of the evaporative fuel systems of vehicles so equipped. Such testing is typically done at centralized stations employing a plurality of inspection and testing lanes. The "through-put", or average time required to complete the required inspection and testing at such facilities is always under review for improvement. However, certain testing procedures have heretofore required a certain amount of physical disassembly and reassembly of vehicle components to complete testing.

For example, a current method for testing evaporative systems requires that the fuel vapor vent hose, leading from the fuel tank to the system's charcoal canister, be disconnected at the canister. Then, the hose is connected to a testing device which pressurizes the fuel tank and the remainder of the system for a predetermined period, during which pressure is monitored to detect possible leaks in the system's seals. After the test is complete, the hose must again be restored to its original connection to the canister. Such a testing method is classified as "intrusive" in the industry, and exhibits a number of significant disadvantages.

It is estimated that in approximately ten to twenty percent of the vehicles, the charcoal canisters of the evaporative systems are simply inaccessible. Such vehicles would require a waiver from testing, resulting in a significant number of vehicles never being tested for harmful or unsafe fuel vapor leaks. Also, the process of locating, disconnecting, testing, and reconnecting the correct canister hose is time consuming, increasing through-put time for the testing facilities. Finally, there is a risk of damaging some of the components which must be detached, moved, and reattached to complete the testing. Component damage is particularly likely for older vehicles and for vehicles which have an awkward canister location.

The intrusive method does have one advantage, however, in that it tests the seal integrity of all of the evaporative system components of interest, as a functioning, integrated system. These components typically include the vapor vent hose interconnecting the charcoal canister and the fuel tank, the fuel tank, the fuel filler neck, and the fuel tank filler cap. Representative U.S. Patents showing these components as a system, together with a dedicated testing or fault detection device for certain aspects of the fuel system, include U.S. Pat. Nos. 4,962,744, issued to Uranishi et al., and 5,143,035, granted to Kayanuma.

The prior art also includes non-intrusive testing devices, designed to eliminate most of the above-identified problems associated with the intrusive approach. Thus far, such non-intrusive testing systems contemplate the removal of the fuel tank filler cap and the connection of a pressurization and metering device to the filler neck opening. For example, U.S. Pat. No. 5,239,858, issued to Rogers et al., shows the connection of a helium cylinder and a flow meter to an evaporative system, using a connector cap on the filler neck. Such a testing apparatus still requires that the fuel tank filler cap be tested separately for sealing abilities on a "dummy" filler neck, connected to additional testing apparatus.

Separate testing of the filler cap is the prime disadvantage of this non-intrusive technique, as it does not test the sealing capability of the vehicle's actual filler cap against its own filler neck. In other words, it does not test these components as an operating system, and thus may produce inaccurate, unpredictable results. And, since the filler cap and filler neck components are those which are subject to the greatest wear in an evaporative system, the inability of this prior art apparatus to test these components as a system is a serious deficiency.

SUMMARY OF THE INVENTION

The present invention includes a operator's console and an associated pressure control and monitor unit, the latter being portable and adapted for temporary insertion within the fuel filler neck of a motor vehicle under test. Certain structures, control systems and monitoring instruments are located on and within the portable unit, to effect the sequential pressurization and testing of the vehicle's evaporative system in a non-intrusive manner.

In a preferred embodiment, the exterior of the cylindrically-shaped body or housing of the portable unit includes a circumferential ring bladder which may selectively be inflated or deflated, respectively, to increase or decrease the effective diameter around an intermediate portion of the housing. With the bladder deflated, the elongated housing is readily inserted into the filler neck, leaving the upper end of the housing accessible. A gas pressurization line, having a selectable pair of outputs, is then attached by means of a bayonet connector to first and second receptor ports in the exposed, upper end of the housing. The pressurization line leads to the operator's control console, provided with pressurized gas from an adjacent air compressor, or another convenient source.

As a further step in preparation for the test, the vapor vent line, leading from the fuel tank to the charcoal canister, must temporarily be crimped. This ensures that the canister, which includes a vent to the atmosphere, is effectively isolated from the sealed system to be tested under pressure.

Upon initiation of a charge sequence, gas is directed by a solenoid actuated selection valve to the first receptor port, through a bladder control valve, and eventually to the ring bladder. The inflated bladder tightly fills the annular volume between the housing and the sidewall of the filler neck, forming an airtight seal therewith. Pressure actuated circuitry closes the bladder control valve. The fuel tank and the portion of the filler neck between the bladder and the tank now define a confined volume, sealed from ambient pressure.

In a second step, the same solenoid valve redirects gas at a substantially reduced pressure to the second receptor port, connected to a fuel tank fill line. Leading from the upper end of the housing to its lower end, the tank fill line is in communication with the confined volume. A check valve in the tank fill line ensures that when the confined volume is properly pressurized, loss of pressure from reverse flow will not occur.

A microprocessor, a digital memory/storage device, such as a RAM chip, and a pressure transducer are also provided within the housing, to monitor and store tank pressure readings. A serial, electronic communications port is also provided at the exposed end of the housing, for mating to the bayonet connector carrying the gas pressurization line. Transmit and receive communication lines thereby interconnect the electronic circuitry of the portable unit with the control console and an associated computer for the vehicle test lane.

With the sealed volume pressurized, the bayonet connector is removed from the housing and the vehicle's fuel cap is replaced over the end of the fuel filler neck. The cooperative action of the ring bladder and the check valve ensure that the sealed volume remains pressurized. Removal of the bayonet connector automatically starts a ten second time counter, interconnected to the bladder control valve. After the counter times out, the bladder control valve is opened, and the ring bladder deflates.

As the seal breaks between the ring bladder and the filler neck sidewall, the pressurized gas fills the remaining volume of the filler neck, including the sealed side of the filler cap. The pressure transducer confirms that the system is properly charged, and the microprocessor starts a two minute pressure sampling test. During this period, pressure samples are regularly taken, and values are stored in the digital memory device.

After the two minute period has elapsed, the microprocessor compares the pressure values stored in memory with predetermined pressure values, and makes a pass/fail determination. The fuel filler cap is then removed and the exposed end of the housing is examined by the technician. A steadily lighted LED indicates a pass, whereas a flashing LED signifies a fail. Upon withdrawal of the housing, the bayonet connector is reattached to the housing to download the stored pressure values to the lane computer for the vehicle's test record.

DETAILED DESCRIPTION OF THE PREFERRED EMBODIMENT

Figure 1:
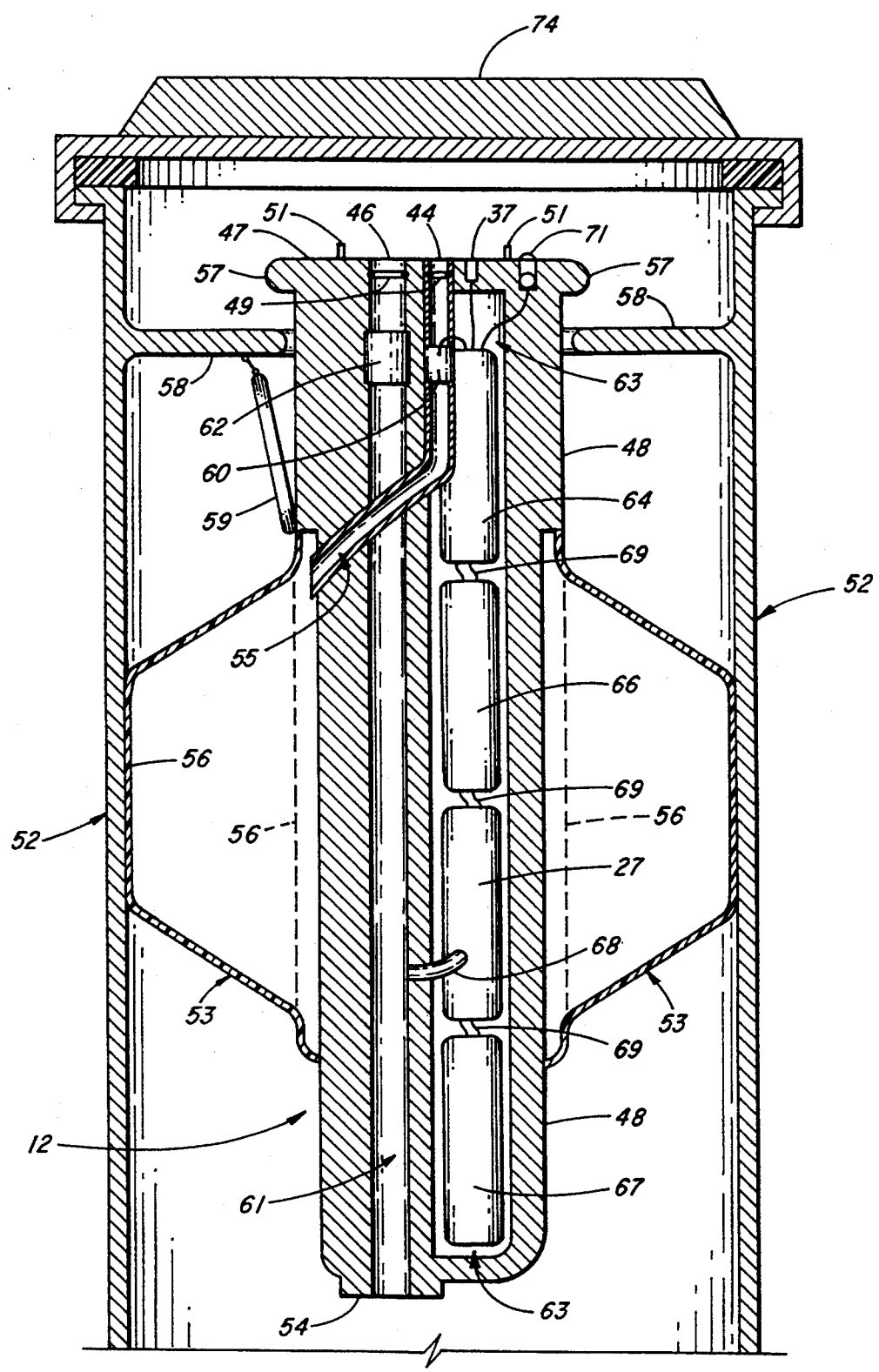
FIG. 1 is a median, longitudinal, cross-sectional view of the pressure control and monitor unit, inserted within a fuel filler neck.

The present invention includes an operator's console 11 and a pressure control and monitor unit 12. Console 11 is typically mounted on a cart, or the like, located adjacent a vehicle testing lane. A convenient source of pressurized gas is provided to the console 11 by an air compressor 13. Other non-reactive gasses suitable for the present application would include nitrogen and helium, which could be provided by a tank supply. A primary pressure regulator 14 is included in the supply line, to limit the maximum pressure of the gas applied to the testing apparatus and to the evaporative system of the vehicle under test.

The console 11 includes an bladder fill gas pressure adjustment leg 16, and a tank fill gas pressure adjustment leg 17. Adjustment leg 16 includes a manually preset pressure regulator valve 18 in series with an electronically controlled needle valve 19. Similarly, adjustment leg 17 includes a manually preset pressure regulator valve 20 in series with an electronically controlled needle valve 25. By appropriately opening and closing needle valves 19 and 25, the gas output rate of the console can precisely be adjusted to carry out the designated tasks.

A solenoid actuated gate valve 21 is also provided, selectively to bleed off or relieve all pressure from a gas pressurization line 22, extending from the console to the monitor unit 12. An electronic pressure transducer 23 is series-positioned in line 22, to measure and monitor gas pressure therein. The output of transducer 23 is directed through a data switching unit 24 to digital display 26 and to a lane computer 28. Both display 26 and computer 28 provide gas pressure data in appropriate units of measure selected by the operator. As will be described below, the display and the computer may also be used to indicate gas pressures detected by a second pressure transducer 27, located in the monitor unit 12.

Lane computer 28 is also utilized, in conjunction with the operator's console 11, for the following purposes: to control the test procedure; to provide a visual display of the collected test data, including the test results; and to store the downloaded data collected during the test procedure. To ensure proper record creation and maintenance, a vehicle identification number is entered into the computer 28 at the outset of the test. Then, when the collected data and test results for that vehicle are obtained, the information will be stored in the proper file and become part of the vehicle's emission test records.

Figure 2:
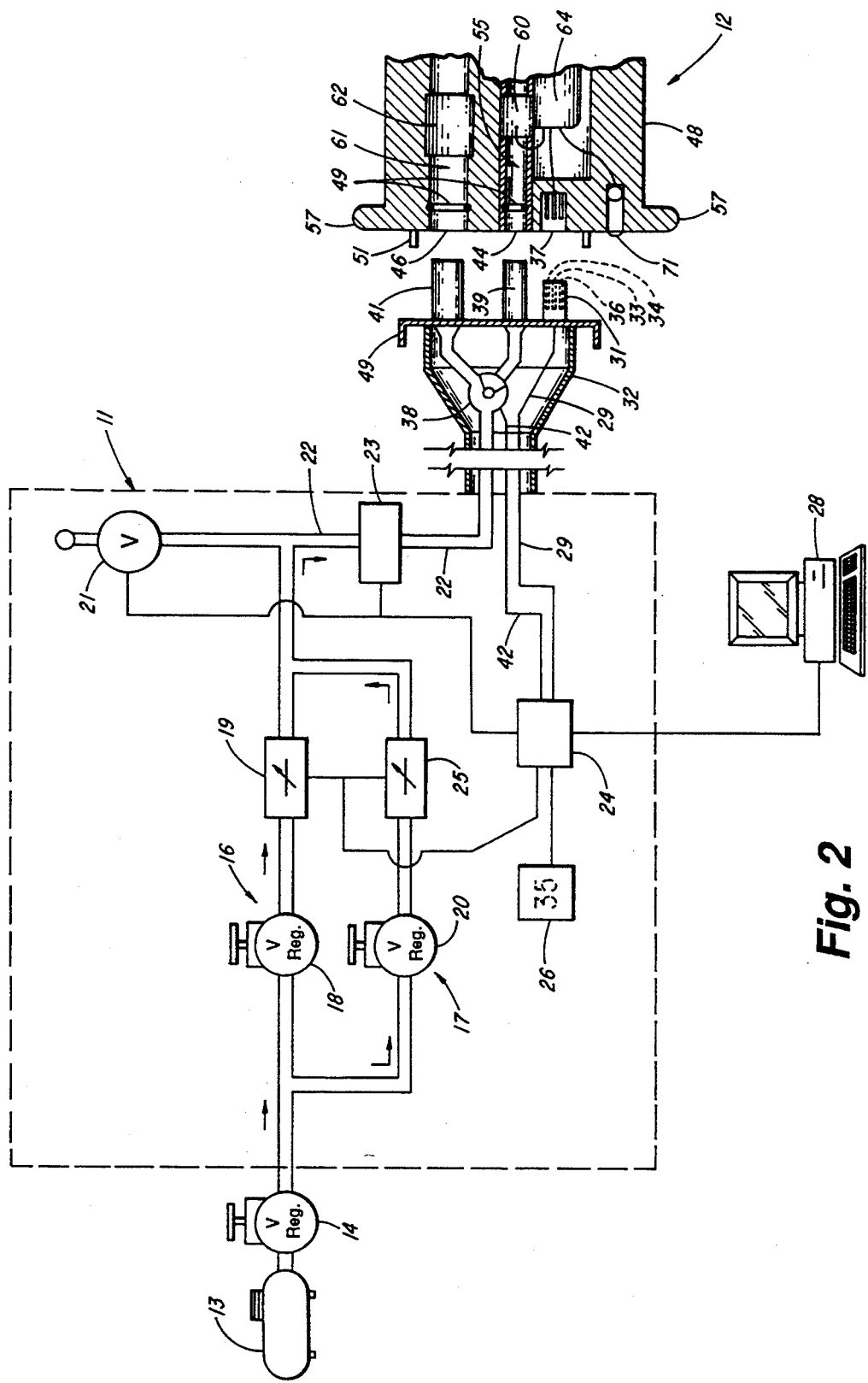
FIG. 2 is a schematic representation including the operator's console, the bayonet connector, and the upper end of the monitor unit; and, FIG. 3 is a schematic representation, showing the pressure control and monitor unit of the present invention in conjunction with a motor vehicle's evaporative system components, under testing conditions.

A serial, data communication cable 29 extends from the switching unit 24 to a plug 31, within bayonet connector 32. Communications cable 29 includes a transmit line 33, a receive line 34, and a common ground line 36. Making particular reference to FIG. 2, it will be appreciated that plug 31 is adapted to mate with socket 37, providing electrical interconnections with the monitor unit 12, for the three data communication lines.

A two-way solenoid valve 38 may conveniently be located within the connector 32, to direct the output of the pressurization line 22 either to a bladder fill tube 39 or to a tank fill tube 41. Alternatively, the solenoid valve or other equivalent means, may be provided in the operator's console, or elsewhere, so that pressurized gas may alternatively be directed to the fill tubes 39 and 41. However, by locating the valve 38 in the bayonet connector, only a single gas pressurization line needs to be provided in the run between the console and the connector head. To provide remote, computer controlled actuation of the valve, a control circuit 42 extends from the valve 38 to the console 11.

A bladder fill receptor, or port 44, and a tank fill receptor, or port 46, are provided in the upper end 47, of elongated housing 48 of unit 12. The inner sidewalls of ports 44 and 46 include O-rings 49, sized to provide tight respective seals with fill tubes 39 and 41 when the bayonet connector 32 is attached to the housing 48. For that purpose, a circular locking ring, having a pair of opposing arcuate cutouts (not shown), is included on the connector 32. By rotating the locking ring, the arcuate cutouts engage the studs 51 on the upper end of the housing, securing the connector and the housing together. It is apparent that any number of alternative means, known to those of ordinary skill in the art, may be used to effect the electrical, pneumatic, and mechanical interconnections which are required herein.

The body, or housing 48 is preferably constructed from a flexible material, such as a gasoline impervious rubber. Right-circular cylindrical and elongated in configuration, housing 48 is sized for insertion into the fuel filler neck 52 of a vehicle. The flexibility of housing 48 ensures that any bends in the upper portion of the neck will not unduly impede insertion of the unit 12. Alternatively, the housing may be preconfigured, generally to follow the shape of a particular filler neck.

The housing 48 also includes a number of significant external and internal structural features. A circumferential ring bladder 53 is located approximately midway between the housing's upper end 47 and its lower end 54. The pneumatically inflatable bladder 53 is connected to port 44, by means of bladder fill line 55. A bladder control valve 60, operatively connected both to console 11 and to an electronic timer discussed below, is located within line 55. Valve 60 thereby controls pressurized gas passing into and out from the bladder 53.

The purpose of bladder 53 is selectively to determine the effective diameter of housing 48. Thus, in a deflated condition, the bladder allows ready insertion of the unit 12 into the fill neck; and, in an inflated condition, the bladder provides an airtight seal with the inner wall of the fill neck. FIG. 1 shows in broken line, the retracted position of wall 56 when the bladder is deflated. Also evident in this view, is the tight, contingent relation between the neck sidewall and the wall 56, when the bladder is fully inflated.

Other means may be used to expand the diameter of the housing 48 to carry out the purposes of the present invention. For example, any appropriately sized and configured element which is expandable, for example, by mechanical, hydraulic, or magnetic means to fill an annular volume around a portion of the housing, could readily be substituted for the pneumatic ring bladder.

The upper end 47 of the housing also includes an annular flange 57, sized to rest upon the outer face of the filler neck restrictor 58. The housing is thereby supported in its inserted position and prevented from passing any farther into the filler neck. It should also be noted that when the housing is inserted through the restrictor 58, a spring loaded clapper 59 is urged into an open position. The upper end of the bladder 53 is spaced from the clapper 59 to ensure that the clapper will not interfere with the inflated bladder.

A tank fill line 61 extends from the tank fill port 46 to the lower end 54 of the housing. As will be discussed more fully below, the function of this line is to allow the uni-directional passage of pressurized gas through the housing, into a contained volume within the vehicle's evaporative system. To this end, a check valve 62, directed toward the lower end, is located within the fill line 61, thereby preventing any reverse flow of gas from the pressurized evaporative system back through the line toward the console 11.

An elongated chamber 63 is provided in the housing, to contain the electronic components which control and monitor the pressure testing procedures described herein. These components include a microprocessor 64, a digital memory device 66, such as a RAM chip, the second pressure transducer 27, and a battery 67.

The microprocessor 64 includes control and logic circuitry to carry out a pressure test sequence, including a pass/fail determination for the vehicle's evaporative system. The pressure transducer 27 is operatively connected to line 61 by means of tube 68, and constantly monitors the pressure therein. The memory device 66 stores the output of the pressure transducer over a predetermined period of time, and this data is subsequently downloaded to the computer 28. The battery 67 provides power to the electronic circuitry, and allows independent, portable operation of the unit 12. Flexible cable 69, provides the necessary interconnections among the components while allowing the housing freely to bend as required. A light emitting diode, or L.E.D. 71 is included in the upper end 47, to provided a visual signal of the pass/fail determination to the operator, upon completion of a testing procedure. Other conventional visual and aural means, well known to those of ordinary skill in the art, may be employed to signal the operator as to the results of the microprocessor's determination.

Figure 3:
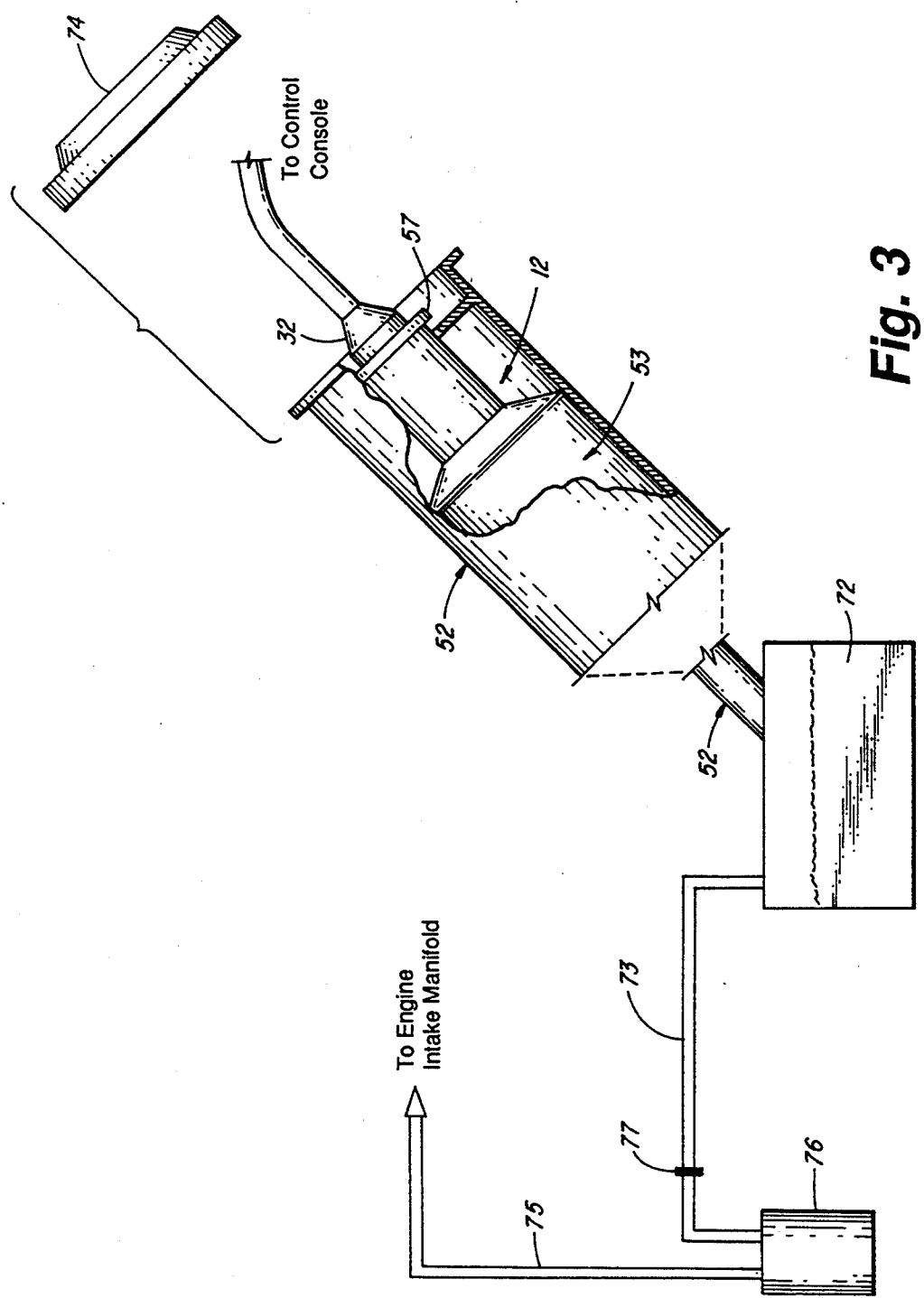

Turning now to FIG. 3, the use of the present invention in conjunction with the evaporative system of a typical test vehicle will be explained. In addition to the fuel filler neck 52, the evaporative system components under test include a fuel tank 72, a vapor vent hose 73, and a filler neck cap 74. The vapor vent hose is connected to a charcoal canister 76, designed to absorb gasoline vapors from the tank 72. A purge line 75, also extends from the canister 76, to the engine's intake manifold or fuel injection system. However, for purposes of the present test, purge line 75 and canister 76 are isolated from the remaining evaporative system components by placing a clamp 77 over any accessible section of the vent hose 73.

In further preparation, the bayonet connector 32 is attached to the pressure control and monitor unit 12. After removing the filler neck cap 74, the unit 12 is then inserted into the filler neck 52, until the flange 57 rests against the restrictor 58. Using the computer 28, the operator initiates a bladder fill sequence. Control signals close gate valve 21 and rotate valve 38 into the bladder fill position. Then, needle valve 19 within pressure adjustment leg 16 is gradually opened by computer control, filling bladder 53 with air. Pressure regulator valve 18 ensures that bladder 53 will not be subjected to damaging pneumatic pressures. The computer samples the output of pressure transducer 23, to confirm that the bladder has been filled to a predetermined pressure. With the air pressure sufficient to effect a filler neck seal, the computer ends the bladder filling sequence. Bladder control valve 60 is then closed, so that the proper amount of pressure is maintained within the bladder.

To pressurize fuel tank 72 and its associated components, the operator enters a tank fill command, initially closing needle valve 19 while opening needle valve 25. A command signal then actuates solenoid valve 38, redirecting pressurized air into tank filler line 61. Transducer 27 transmits tank pressure data back to computer 28, by way of transmit line 33 and data communications cable 29. Software for the computer 28 includes control algorithms which adjust valve 25 appropriately to effect an optimal fill flow rate. When the target tank pressure is achieved, the computer closes needle valve 25 and signals the operator to disconnect the bayonet connector 32 from unit 12.

Removing the connector 32 triggers time counters both in the computer 28 and in the microprocessor 64. Check valve 62 in the tank fill line 61 ensures that air pressure in the contained volume of the evaporative system will be maintained. The operator quickly installs cap 74 over the end of filler neck 52, covering the exposed upper end of the housing and sealing the entire evaporative system. Approximately ten seconds after the bayonet connector is removed, the electronic counter in the microprocessor 64 produces a timer pulse, opening bladder control valve 60.

As the ring bladder deflates, the bladder/sidewall seal breaks, releasing pressurized gas into the remaining volume of the evaporative system, existing between the broken seal and the cap 74. Pressure transducer 27 confirms that the evaporative system is pressure charged within acceptable limits, and the microprocessor 64 begins to time out a two minute pressure decay test, required under the current testing procedure. Microprocessor 64 then samples the output of the transducer 27 at a 2 Hz rate, and stores the pressure data in the digital memory board 66.

After the two minute sampling period has elapsed, the microprocessor makes a pass/fail determination, based upon a comparison of the collected data with predetermined pressure decay values stored in the microprocessor. The L.E.D. 71 on the upper end of the housing lights continuously if the vehicle passed the test, and flashes if the vehicle failed. Meanwhile, the timing sequence initiated in the computer 28 times out, giving the operator a signal that the cap 74 may now be removed.

Upon removal of the cap and examination of the L.E.D., the operator confirms whether the vehicle passed or failed. If the vehicle failed, it may be retested immediately, based upon established testing procedures. Retesting may be appropriate if the operator has reason to suspect that the clamp 77 did not adequately seal off line 73; also, if the pressure decay readings are only slightly under the predetermined standard values, the operator may elect to retest the system. If the vehicle passed or if testing protocol does not call for retesting, the data is downloaded to the lane computer 28 for record maintenance. For this purpose, the bayonet connector 32 is reconnected to the housing's upper end 47, as before, and the unit 12 is removed from the filler neck. The lane computer calls for the data, and the microprocessor 64 transmits the stored data in response. A hard copy of the test results may then be printed from the records of the lane computer.

By repeating this process, additional motor vehicles may be tested seriatim in a regular and efficient manner, without necessitating the intrusive disassembly of evaporative system components or the separate testing of the cap/filler neck seal. It will be appreciated, then, that I have provided an improved and effective apparatus and method for testing motor vehicle evaporative fuel systems.

What is claimed is:

1. An apparatus for testing the integrity of the seals of a motor vehicle evaporative system having a tank, a tank filler neck with one end connected to the tank, and a filler cap for selectively opening and sealing the other end of the filler neck, the apparatus comprising:
   a. a body adapted for insertion within the tank filler neck so that an upper end of said body is accessible with the filler cap removed;
   b. means for selectively expanding at least a portion of said body, from a first reduced diameter, for insertion into the neck, into a second expanded diameter, in which said portion is brought into contingent sealing relation with an inner sidewall of the neck, defining a contained volume between said portion and the tank;
   c. means for passing pressurized gas through said body into said contained volume, and thereafter sealing the other end of the filler neck with the filler cap;
   d. means for selectively reducing the diameter of said portion into said first reduced diameter, thereby allowing gas within said contained volume to pressurize the volume remaining between said portion and the filler cap;
   e. means for measuring the pressure within the pressurized volume for a predetermined period of time to detect leaks in the evaporative system.

2. An apparatus as in claim 1 in which said expanding means includes a pneumatically actuated ring bladder, circumferentially positioned around said body.

3. An apparatus as in claim 2, further including a bladder fill line extending from said upper end to said bladder, and a control valve in said fill line, adapted selectively to control gas passing into and exiting from said bladder.

4. An apparatus as in claim 3 including a tank fill line having a connector on one end for attachment to said upper end of said body, and further including timing means operatively connected to said bladder control valve, for allowing gas to discharge from said bladder a predetermined period of time after said connector is removed from said upper end.

5. An apparatus as in claim 4 in which said timing means includes a microprocessor.

6. An apparatus as in claim 5 in which said pressure measuring means includes a pressure transducer in communication with the contained volume.

7. An apparatus as in claim 6, in which said microprocessor includes predetermined pressure decay values and logic means, said microprocessor further being operatively connected to memory means, so that after the elapse of said predetermined period of time, said logic means compares output data from said pressure transducer with said pressure decay values, and makes a pass/fail determination.

8. An apparatus as in claim 7, further including signal means, providing an indication of the outcome of the pass/fail determination.

9. An apparatus as in claim 8, in which said signal means comprises a light emitting diode, on the upper end of said body.

10. An apparatus as in claim 1 in which said gas passing means includes a tank fill line, extending from said upper end to a lower end of said body.

11. An apparatus as in claim 10 further including a check valve in said tank fill line, said valve having an open end directed toward said lower end.

12. An apparatus for testing the integrity of the seals of a motor vehicle evaporative system having a tank, a tank filler neck with one end connected to the tank, and a filler cap for selectively opening and sealing the other end of the filler neck, the apparatus comprising:
  a. a housing having an upper end, a lower end, and an intermediate portion therebetween, said housing being adapted for temporary insertion into the tank filler neck so that said upper end is accessible with the filler cap removed;
  b. a ring bladder, circumferentially extending around said intermediate portion, said bladder being selectively inflatable and deflatable, respectively, to increase and decrease the effective transverse dimension of said intermediate portion;
  c. a first tube in said housing, extending from said upper end to said ring bladder, said first tube having a control valve therein to direct the passage of gas into and from said bladder, so that after said housing is installed into the filler neck, gas is introduced into said upper end of said first tube to inflate said bladder, temporarily forming a gas tight seal between the inner sidewall of the neck and said bladder;
  d. a second tube in said housing extending from said upper end to said lower end, said second tube having a check valve therein directed toward said lower end, so that gas may be introduced into said upper end of said second tube, effective to pressurize the contained volume of the evaporative system defined by said ring bladder, the fuel tank, and the portion of the neck therebetween;
  e. a timer, operably connected to said control valve, whereby, said timer is actuated and the filler cap is replaced over the open end of the filler neck, and following a predetermined period of time from the timer actuation, said valve is actuated from a closed position into an open position, deflating the bladder and allowing gas within the contained volume to pressurize the remaining volume.

13. An apparatus as in claim 12 including means within said housing for measuring the gas pressure in said motor vehicle evaporative system.

14. An apparatus as in claim 13, further including memory means responsive to said measuring means for storing gas pressure measurements taken over a predetermined period of time.

15. An apparatus as in claim 14 further including a microprocessor having predetermined pressure decay values and logic means, said microprocessor further being operatively connected to said memory means, so that after the elapse of said predetermined period of time, said logic means compares stored output data from said measuring means with said pressure decay values, and makes a pass/fail determination.

16. A method for testing the integrity of the seals of a motor vehicle evaporative system having a tank, a tank filler neck with one end connected to the tank, and a filler cap for selectively opening and sealing the other end of the filler neck, the method comprising:
  a. installing a body within the tank filler neck so that an upper end of said body is accessible with the filler cap removed, said body having a first reduced diameter for installation;
  b. expanding the diameter of said body to a second expanded diameter, for sealing the filler neck;
  c. passing a gas through said body and pressurizing the contained volume between said body and the tank;
  d. sealing the other end of the filler neck with the filler cap;
  e. reducing the diameter of said body, thereby allowing gas within the contained volume of the evaporative system to pressurize the remaining volume;
  f. measuring the pressure of the gas within the evaporative system for a predetermined period of time to detect leaks in the seals thereof.

17. A method as in claim 16, including the step of storing the measured pressure data for said predetermined period of time.

18. A method as in claim 17, further including the step of removing the filler cap and extracting the body from the filler neck.

19. A method as in claim 17, further including the step of removing the filler cap and downloading the stored pressure data to a computer for storing said data in said computer.

20. A method as in claim 17, further including the step of comparing said stored pressure data to predetermined pressure decay values, and making a pass/fail determination.

* * * * *